United States Patent [19]

Tojima

[11] Patent Number: 4,947,975
[45] Date of Patent: Aug. 14, 1990

[54] RELEASE BEARING MECHANISM OF A CLUTCH

[75] Inventor: Hiromi Tojima, Neyagawa, Japan
[73] Assignee: Kabushiki Kaisha Daikin Seisakusho, Neyagawa, Japan
[21] Appl. No.: 336,352
[22] PCT Filed: May 25, 1988
[86] PCT No.: PCT/JP88/00505
§ 371 Date: Jan. 31, 1989
§ 102(e) Date: Jan. 31, 1989
[87] PCT Pub. No.: WO88/09883
PCT Pub. Date: Dec. 15, 1988

[30] Foreign Application Priority Data

Jun. 4, 1987 [JP] Japan .............................. 62-86857[U]
Jun. 4, 1987 [JP] Japan .............................. 62-86858[U]
Feb. 9, 1988 [JP] Japan .............................. 63-15912[U]

[51] Int. Cl.⁵ .............................................. F16D 23/14
[52] U.S. Cl. ..................................... 192/98; 192/110 B
[58] Field of Search .............................. 192/98, 110 B

[56] References Cited

U.S. PATENT DOCUMENTS 4,588,061 5/1986 Mallet ..................................... 192/98
4,691,815 9/1987 Maycock et al. ...................... 192/98
4,718,528 1/1988 Caron et al. ................. 192/110 B X
4,733,762 3/1988 Gay et al. .............................. 192/98

FOREIGN PATENT DOCUMENTS 3113463 12/1982 Fed. Rep. of Germany ........ 192/98
59-197623 11/1984 Japan .
62-37522 2/1987 Japan .
62-246628 10/1987 Japan .

*Primary Examiner*—Richard Lorence
*Attorney, Agent, or Firm*—Armstrong, Nikaido, Marmelstein, Kubovcik & Murray

[57] ABSTRACT

A release bearing mechanism of a clutch comprises release bearing including an inner race provided with axial extension, a lever plate fitted to the extension and fixed to a diaphragm spring, the lever plate provided with a ring escape groove, a tapered guide portion and a ring fitting portion, the extension being provided with a ring escape groove and a second ring fitting portion, an elastic connecting ring interposed between the lever plate and the extension, a ring pushing means for pushing the connecting ring from ring fitting portion to the other ring escape groove. The ring escape grooves have depth which permits axially relative movement between the lever plate and the extension when the connecting ring is accommodated therein. The fitting portions are adapted to fit to the connecting ring at radially opposite directions and axially opposite directions.

5 Claims, 7 Drawing Sheets

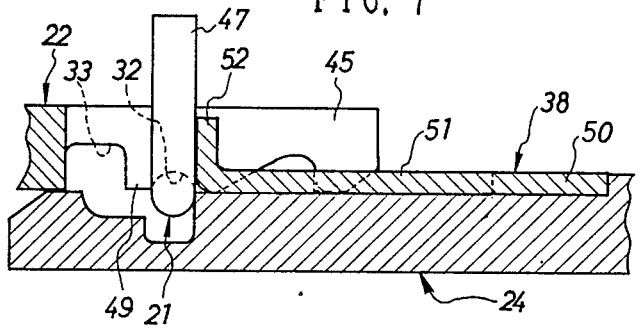
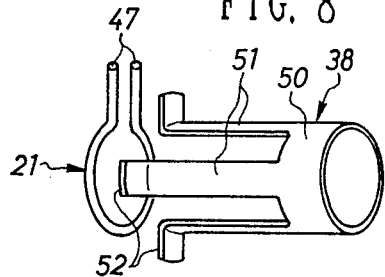
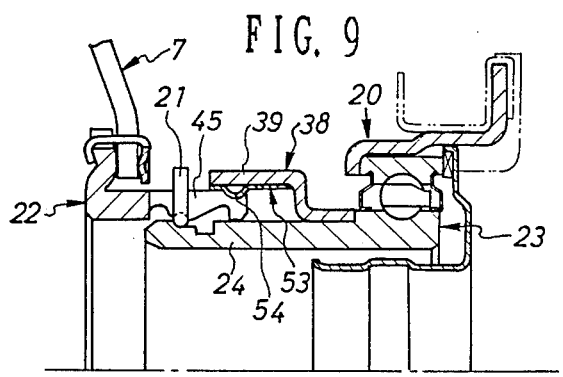

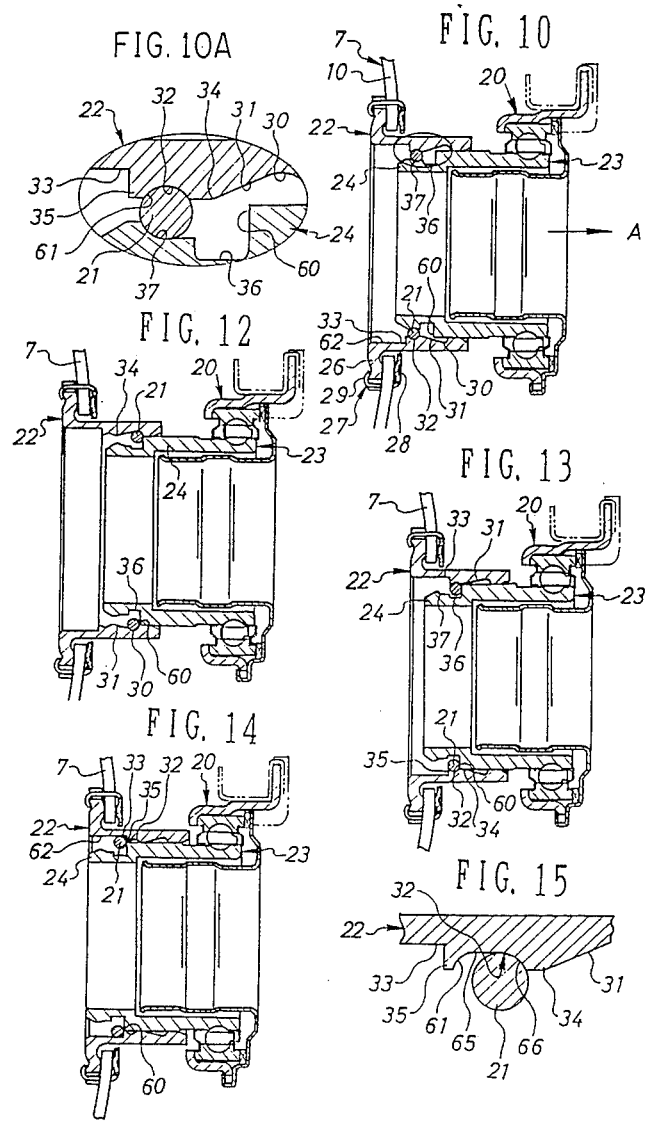

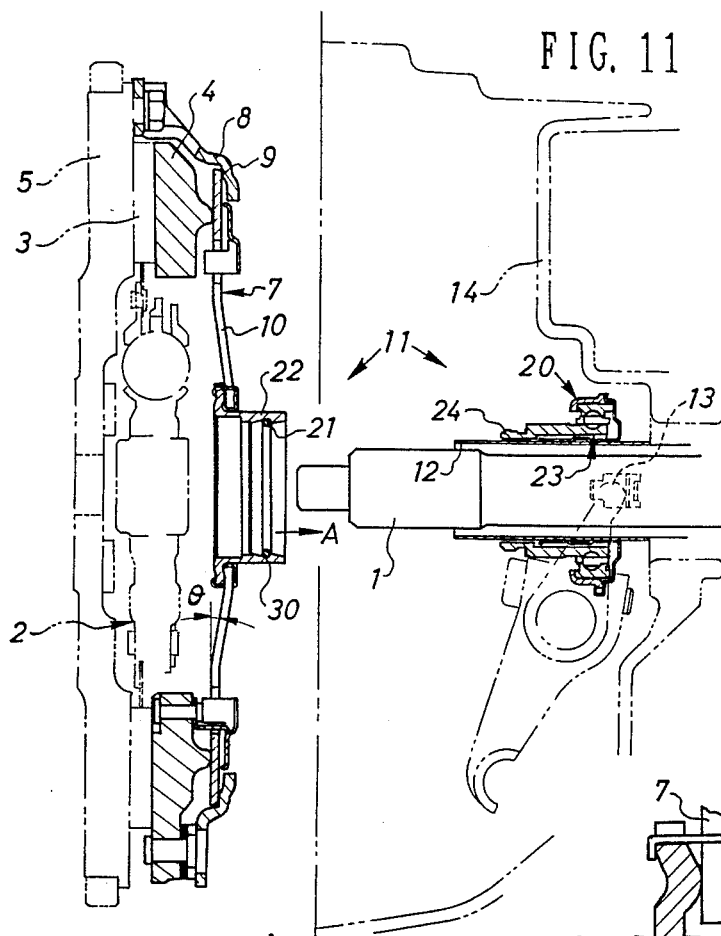
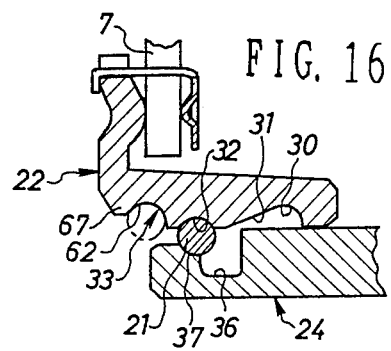
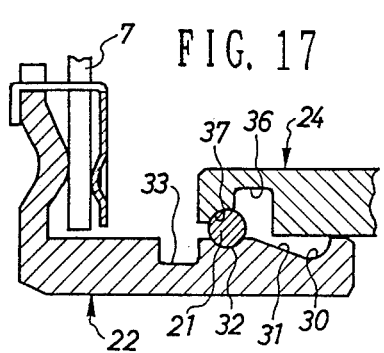
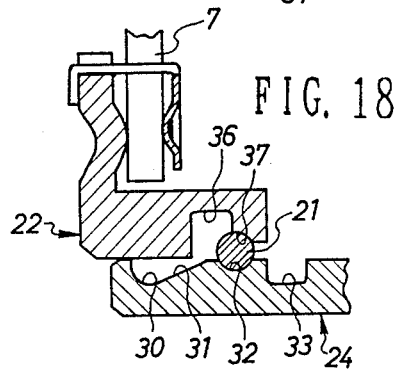

RELEASE BEARING MECHANISM OF A CLUTCH

BACKGROUND OF THE INVENTION

1. Field of the Invention

The present invention relates to a release bearing mechanism used in friction clutches for automobiles, and particularly to a release bearing mechanism for clutches employing diaphragm springs of the pull type.

2. Description of the Prior Art

As is well known, the diaphragm spring is used to force a pressure plate against a friction facing of a clutch disk. In the clutch of the pull type, a radially inner portion of the diaphragm spring is pulled by the release bearing mechanism axially away from the clutch disk to disengage or release the clutch.

In the release bearing mechanism used in such clutch of the pull type, as disclosed in laid open Japanese patent application No. 59-197623 and Japanese patent application No. 61-90834, corresponding U.S. patent application Ser. No. 270,371, copending herewith, an extension of an inner race of a release bearing is inserted into a cylindrical connecting member, which is fixed to the inner periphery of the diaphragm spring, and is connected thereto through an intermediate member.

In this structure, the release bearing and the connecting member can be facilely disassembled and assembled by removing or attaching the intermediate member or by deforming it. In the structure disclosed in the above application No. 59-197623, the intermediate member is however formed by a snap ring or the like which can elastically and radially deflect in the assembled condition, so that the position of the intermediate member may be deviated by a centrifugal force, which may cause partial stress in the intermediate member, resulting in breakage of the intermediate member.

In the structure disclosed in the above application No. 61-90834, since the intermediate member is formed by a cylindrical or tubular member, which is closely fitted to the connecting member and the inner race, the above problem can be dissolved.

However, in the structure disclosed in the above application No. 61-90834, the inner race must be axially moved a long distance toward the clutch disk for disassembly. Therefore, in the assembled condition, the inner race must be located apart from the clutch disk with a long distance therebetween, resulting in increase of the whole axial size of the clutch. Further, the diaphragm spring must be inclined to a large extent with respect to the radial direction of the clutch in accordance with the position of the inner race, so that a large bending moment caused by the centrifugal force is applied to the diaphragm spring during the driving operation, resulting in decrease of the force applied from the diaphragm spring to the pressure plate.

U.S. Pat. No. 4,632,237 also disclosed a structure similar to the prior art stated above. In this structure, since an intermediate member can elastically and radially deflect in the assembled condition (i.e.. connected condition), a connecting member fixed to the diaphragm spring may not be strongly and stably connected to the inner race of the release bearing.

SUMMARY OF THE INVENTION

According to the invention, a release bearing mechanism of a clutch comprises:

a release bearing to which an operation mechanism is connected for applying an operation force in an axially outward direction of the clutch thereto, the release bearing including an inner race provided with an axially inwardly extending cylindrical extension;

a cylindrical lever plate fitted to the cylindrical extension and fixed to a diaphragm spring;

the cylindrical extension and the lever plate including a pair of cylindrical surfaces fitting to each other;

one of the cylindrical surfaces being provided with a ring escape groove, a substantially tapered guide portion extending axially and radially from a bottom surface of the escape groove and a first ring fitting portion adjacent to the guide portion;

the other of the cylindrical surfaces being provided with a ring escape groove and a second ring fitting portion adjacent thereto;

a radially elastically deflected connecting ring interposed between a pair of the cylindrical surfaces;

a ring pushing means for axially pushing the connecting ring from the second ring fitting portion to the ring escape groove on the other cylindrical surface;

both of the ring escape grooves having depth which permits axially relative movement between the lever plate and the extension when the connecting ring is accommodated in either of the grooves; and both of the fitting portions being adapted to fit to the connecting ring at radially opposite directions and axially opposite directions, respectively.

BRIEF DESCRIPTION OF THE DRAWINGS

FIGS. 4, 5 and 6 are sectional views illustrating various conditions during assembly and/or disassembly operation, respectively;

FIG. 7 is a sectional view illustrating a modified structure of the embodiment in FIG. 1;

FIG. 8 is a fragmentary schematic perspective view of the embodiment in FIG. 7;

FIG. 9 is a sectional view of a further modified structure;

FIG. 10 is a sectional view of a second embodiment;

FIG. 11 is a sectional view, in an exploded condition, of a clutch embodiment in FIG. 10;

FIGS. 12, 13 and 14 are sectional views illustrating various conditions during assembly and/or disassembly operation, respectively;

FIGS. 15–18 are sectional views of modified structures of the embodiment in FIG. 10, respectively;

DESCRIPTION OF THE PREFERRED EMBODIMENTS

Figure 2:
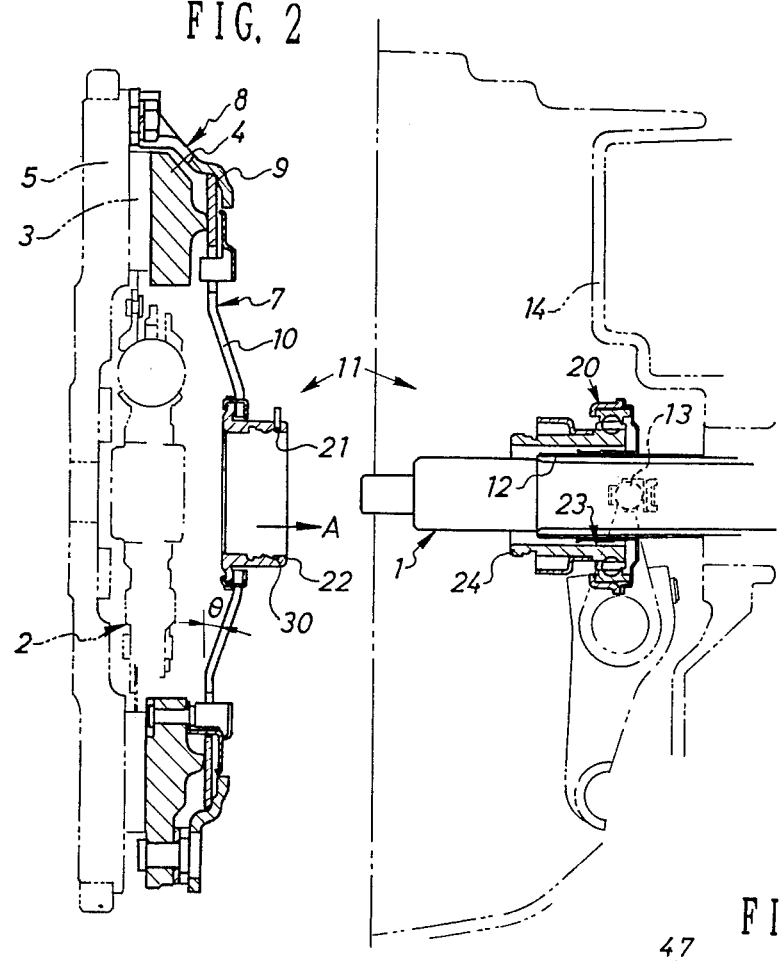
FIG. 2 is a sectional view, in an exploded condition, of a clutch employing the embodiment in FIG. 1.

Referring to FIG. 2, which illustrates, in an exploded condition, a clutch employing an embodiment of the invention, a clutch output shaft 1 connected to a clutch disk 2 provided at the radially outer portion with a friction facing 3, which is adapted to be pressed by a pressure plate 4 against a flywheel 5 to engage the clutch. At the rear side of the pressure plate 4 is arranged an annular diaphragm spring 7 for biasing the pressure plate 4 toward the friction facing 3. The diaphragm spring 7 is connected at the radially outer portion to the pressure plate 4 and is supported at the rear side of the radially outer end by a fulcrum portion 9 of a clutch cover 8, which is fixed to the flywheel 5. The diaphragm spring 7 has radial slits 10 or slots extending from inner periphery to the radially middle portion thereof, and is connected at the radially inner end to a release bearing mechanism 11. The release bearing mechanism 11 is slidably fitted around a sleeve 12 disposed around the output shaft 1, and is connected to an operation mechanism 13. The operation mechanism 13 is supported by a clutch housing 14 and is connected to a clutch pedal (not shown). The clutch housing 14 is fixed at an end remote from the flywheel 5 to a transmission housing (not shown).

When the clutch pedal is depressed by a driver, the operation mechanism 13 moves the whole of the release bearing mechanism 11 axially outwardly, as indicated by arrow A, whereby the release bearing mechanism 11 pulls the radially inner end of the diaphragm spring 7 in the same direction to disengage the clutch.

The release bearing mechanism 11 comprises a bearing 20, a connecting ring 21 and a lever plate 22. Prior to the assembly of the diaphragm spring 7 to the release mechanism 11, the connecting ring 21 and the lever plate 22 are assembled to the diaphragm spring 7 to form together with the spring 7 and the clutch cover 8 an assembly fixed to the flywheel 5. The bearing 20 is assembled together with the sleeve 12 and the operation mechanism 13 to the clutch housing 14 to form an assembly fixed to the transmission housing. These assemblies which are individually assembled are coaxially connected together, as shown in FIG. 1.

Figure 1:
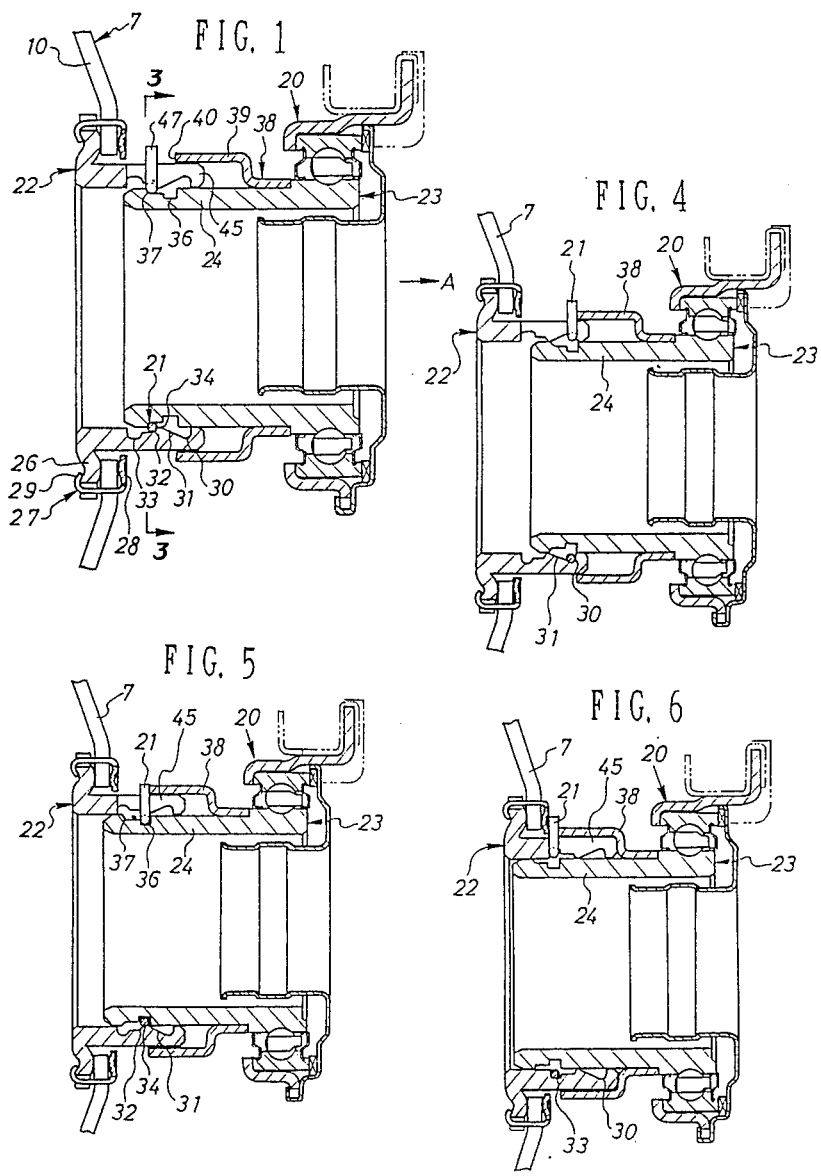
FIG. 1 is a sectional view of an embodiment of the invention.

Referring to FIG. 1, the bearing 20 is located axially outside (righthand in FIG. 1) the diaphragm spring 7. An inner race 23 of the bearing 20 has an integral cylindrical extension 24 projecting in the axially inward direction. A free end of the extension 24 is located radially inside the lever plate 22. The connecting ring 21 formed by a member having a circular section is interposed between the extension 24 and the lever plate 22.

The lever plate 22 is provided at the axially inner end with radially outward flange 26, which is located axially inside the diaphragm spring 7 and is axially immovably connected to the spring T by a support plate 27.

The support plate 27 includes an annular body 28 which is integrally provided at the outer periphery with circumferentially spaced bent projections 29. The annular body 28 is in contact with the axially outer side of the radially inner portion of the diaphragm spring 7. The projections 29 extend through the slits 10 in the diaphragm spring 7 and engage with grooves or recesses formed at the outer periphery of the flange 26, respectively. Ends of the projections 29 located axially inside the flange 26 are bent radially inwardly.

The lever plate 22 is provided at the inner peripheral surface with a first ring escape groove 30, a guide portion 31, a connecting ring fitting portion 32 and a second ring escape groove 33.

The first ring escape groove 30 is located adjacent to the axially outer end of the lever plate 22. The guide portion 31 is formed by a tapered surface continuously extending axially inwardly from the bottom surface of the groove 30, and has the smallest diameter at the axially inner end 34. The fitting portion 32 is located axially inside the end 34, and is closely fitted to the radially and axially outer sides of the connecting ring 21 in the assembled condition in FIG. 1. The second ring escape groove 33 continues to the bottom surface, which extends substantially in the axial direction, of the fitting portion 32, and has an inner diameter larger than that of the fitting portion 32.

The extension 24 is provided at the outer peripheral surface with a third ring escape groove 38 and an inner ring fitting portion 37 which is located adjacent to and axially inside the groove 36. The escape groove 36 has an inner diameter larger than that of the fitting portion 37. The bottom surface of the fitting portion 37 continues to the axially inner edge of the escape groove 36. The fitting portion 37 is closely fitted to the radially and axially inner sides of the connecting ring 21.

A cylindrical pusher 38 has a portion of a small diameter which is rigidly fixed around the axially outer portion of the extension 24. The pusher 38 has an enlarged cylindrical portion 39, of which inner diameter is larger than the outer diameter of the cylindrical portion of the lever plate 22. The position of the axially inner end 40 of the pusher 38 is so set that the end 40 is radially aligned to the axially outer edge of the groove 36.

Figure 3:
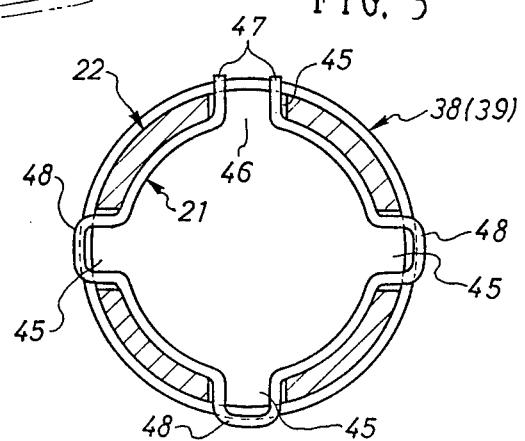
FIG. 3 is a sectional view taken along line III—III in FIG. 1.

The lever plate 22 is provided with slits 45 which extend in the axial direction from the axially outer end of the lever plate 22 to the position radially outside the second escape groove 33. The axially inner ends of the slits 45 are radially aligned to the axially inner edge of the groove 33. As shown in FIG. 3, the slits 45 are formed at circumferentially spaced four positions in the lever plate 22.

The connecting ring 21 is provided with one cut 46 for permitting elastical deflection in the radial direction thereof. When the ring 21 is assembled inside the lever plate 22, as shown in the FIGS. 1 and 3, it is deflected elastically and radially inwardly. The ends 47 at opposite sides of the cut 46 of the ring 21 are bent radially outwardly. The ring 21 is also provided at the circumferentially spaced three portions with nearly inverted U-shaped bents 48 projecting radially outwardly. These bents 48 and a pair of the ends 47 engage with the slits 45 and are projected radially outwardly beyond the outer periphery of the lever plate 22. The enlarged cylindrical portion 39 (FIG. 1) of the pusher 38 is opposed to the bents 48 and the ends 47 from the axially outer side.

The specific positions and sizes of the portions and parts described above are so determined that they may operate as described below.

In the clutch disengaging operation, the operating mechanism 13 moves the release bearing 20 axially outwardly as indicated by the arrow A, so that the lever plate 22, which is assembled as shown in FIG. 1, is moved in the same direction through the connecting ring 21, and thus, the radially inner end of the diaphragm spring 7 is moved in the axial direction.

In the assembling operation of the mechanism described above, the connecting ring 21 is located in the first ring escape groove 30 in the lever plate 22, as illustrated in FIG. 2. Then, the release bearing 20 is moved axially inwardly to push the inner race 23 into the assembling position. In this operation, as shown in FIG. 4, when the inner race extension 24 is inserted into the lever plate 22 to some extent, the pusher 38 contacts the connecting ring 21. By further pushing the inner race 23, the pusher 38 pushes the connecting ring 21 in the same direction, so that the connecting ring 21 moves axially and radially inwardly along the tapered guide portion 31 and enters into the third ring escape groove 36 in the extension 24, as shown in FIG. 5. In this position, the connecting ring 21 does not axially engage with any portion of the lever plate 22, so that the ring 21 passes relatively through the radially inner sides of the end 34 of the guide portion 31, and moves to a position radially inside the fitting portion 32 of the lever plate 22. When the connecting ring 21 reaches this position, it elastically deflects in the radially outer direction and is fitted to the fitting portion 32. Then, the release bearing 20 is axially outwardly returned, so that the fitting portion 37 of the inner race extension 24 is fitted to the connecting ring 21, as shown in FIG. 1, and thus, the assembly is completed.

In order to disassemble the mechanism described above, the release bearing 20 is pushed axially inwardly to temporarily move the inner race 23 from the assembly position shown in FIG. 1 to the pushed-in position shown in FIG. 6. Whereby, the connecting ring 21 is pushed by the pusher 38 from the position fitting to the portion 32 into the second escape groove 33. In this condition, the connecting ring 21 does not engage with the extension 24, so that the release bearing 20 can be moved axially outwardly to axially outwardly pull the extension 24 completely out of the lever plate 22.

In the disassembling operation described above, when the connecting ring 21 is fitted into the second escape groove 33, i.e., when the inner race 23 is completely pushed to a predetermined position, the ring 21 contacts the base ends of the slits 45, so that the further unnecessary pushing operation of the inner race 23 can be prevented.

In order to reassemble the mechanism, it is necessary to fit the ring 21 which has been fitted into the second escape groove 33 into the first escape groove 30. This operation is performed as follows. A pair of the ends 47 (FIG. 3) of the ring 21 projecting beyond the lever plate 22 are pinched by an appropriate tool to approach the ends 47 to each other. Then, the ring 21, of which diameter is reduced, is moved from the groove 33 to the groove 30, and then, the ends 47 are released to closely fit the ring 21 into the groove 30. As described above, the re-fitting operation of the ring 21 can be facilely performed.

According to the structures described hereinbefore, since the assembled connecting ring 21 are radially closely fitted without a space to both of the lever plate 22 and the inner race extension 24, the deviation of the position of the connecting ring 21 can be prevented, and the connecting strength can be increased as compared with the conventional structure performing the connection by the radially unstable ring.

Further, since the assembly and disassembly can be performed by axially relatively moving the bearing 20 and the lever plate 22 from each other, those operation can be facilely performed.

Moreover, either in the assembly and disassembly, since it is not necessary to project the inner race 23 through a long distance beyond the diaphragm spring 7, the axial distance required between the radially inner end of the diaphragm spring 7 and the clutch disk 2 in the assembled clutch can be short. Thus, an inclination angle $\theta$ (FIG. 2) of the diaphragm spring 7 with respect to the radial direction can be small, in other words, the axial length between the radially inner and outer ends of the diaphragm spring 7 can be short. Therefore, the bending moment or force caused by the centrifugal force and applied to the diaphragm spring 7 can be small, and thus, it is possible to effectively prevent the reduction of the force applied by the diaphragm spring 7 to the pressure plate 4 by the influence of the above-mentioned bending moment.

FIGS. 7 and 8 illustrate modified structures of the embodiment described above. In this structure, the axially outer portion of the pusher 38 is formed by a cylindrical portion 50 of a small diameter, which is fixed to the extension 24, similarly to that in FIG. 1. Circumferentially spaced four, i.e., same number as the slits 45, fingers 51 axially extend from the axially inner edge of the cylindrical portion 50. Each finger 51 has a belt-like shape and an arcuate section, and extends along the outer periphery of the extension 24. Each finger 51 is provided at the free end with a radially outwardly bent portion 52 of a belt-like shape. In this modified embodiment, the fingers 51 and the bent portions 52 are located in the slits 45, and the bent portions 52 are adapted to engage with the end 47 (FIG. 8) and the annular portion of the connecting ring 21.

In this modified embodiment, as shown in FIG. 7, the lever plate 22 has a radially inward projection 49 between the fitting portion 32 and the groove 33 for preventing the erroneously move the connecting ring 21 fitted in the fitting portion 32 to the groove 33 during the assembly operation.

In the modified embodiment in FIGS. 7 and 8, the connecting ring 21 is not provided with the bents 48 shown in FIG. 3. Although the bent ends 47 may also be eliminated, it is preferable to form the bent ends 47 so that they may be pinched by the tool so as to facilitating the operation for returning the ring 21 from the groove 33 to the groove 30 in the disassembly operation.

In another modified embodiment shown in FIG. 9, axially extending belt-like plate springs 53 are attached to the inner periphery of the large diameter portion 39 of the pusher 38 which is similar to that in FIG. 1. The axially outer end of each spring 53 is fixed to the pusher 38. The axially inner end of each spring 53 is closely contacted with the inner periphery of the end portion of the pusher 38. The axially middle portion 54 of each spring 53 is curved and radially inwardly projected.

In this structure, the middle portions 54 fitted into the slits 45 can prevent relative rotation between the lever plate 22 and the inner race 23.

When assembling the structures in FIG. 9, the springs 53 may not be fitted into the slits 45 and may be pressed at the middle portion 54 against the outer periphery of the lever plate 22 after the assembly. Even if the parts are assembled as stated above, the springs 53 will be aligned with the slits 45 and the middle portions 54 will be fitted into the slits 45 before the lever plate 22 and the inner race 23 rotate through 90 degrees relative to each other at the start of the operation.

Another embodiments will be described hereinafter.
In FIGS. 10 to 18 as well as FIGS. 19 to 29, parts and members same as or similar to those in FIGS. 1 to 9 bear same reference numbers, and description thereof is omitted.

Referring to FIG. 10, the connecting ring 21 is formed by a substantially annular member having a radial section of a circular shape, and is provided at one portion with a cut. The connecting ring 21 is interposed between the extension 24 and the lever plate 22 and is elastically deflected in the radially inward direction.

The lever plate 22 is provided at the inner peripheral surface with the first ring escape groove 30, the guide portion 31, the connecting ring fitting portion 32, the second ring escape groove 33 and the projection 35.

The first ring escape groove 30 is located at the vicinity of the axially outer end of the lever plate 22. The guide portion 31 is formed by a tapered surface continuously and axially inwardly extending from the bottom surface of the groove 30 and has the smallest diameter at the axially inner end 34. The fitting portion 32 is formed by an annular groove located adjacent to and axially inside the end 34. In the assembled condition shown in FIG. 10, the fitting portion 32 is fitted to the radially and axially outer sides of the connecting ring 21. The second escape groove 33 is located axially inside the groove 30, and has an inner diameter larger than that of the fitting portion 32. The projection 35 is located between the second groove 33 and the fitting portion 32, and is projected radially inwardly beyond the bottom surfaces of the groove 33 and the fitting portion 32.

The extension 24 of the inner race 23 is provided with the third ring escape groove 36 and the ring fitting portion 37 which is located adjacent to and axially inside the groove 36. The groove 36 has a diameter smaller than that of the fitting portion 37, and has the bottom surface continuously extending to the axially inner edge of the escape groove 36. The fitting portion 37 is closely fitted to the radially and axially inner sides of the connecting ring 21 in the assembled condition illustrated in FIG. 10.

The extension 24 further includes a pushing surface 60, which is formed by a radially outer portion of an axially outer side surface, which extends substantially in the radial direction, of the groove 36.

In the assembling operation of the mechanism described above, the connecting ring 21 is fitted into the first escape groove 30 in the lever plate 22, as illustrated in FIG. 11. Then, the release bearing 20 is moved axially inwardly to push the inner race 23 into the assembly position. In this operation, when the inner race extension 24 is pushed into the lever plate 22 to some extent, as shown in FIG. 11, the pushing surface 60 contacts the connecting ring 21. When the inner race 23 is further pushed, the pushing surface 60 pushes the connecting ring 21 in the same direction, so that the connecting ring 21 moves radially inwardly along the tapered guide portion 31 and enters the third escape groove 36 in the extension 24. In this position, the connecting ring 21 does not axially engage with any portion of the lever plate 22, as shown in FIG. 13, so that the ring 21 relatively passes the inside of the small end 34 of the guide portion 31 to a position radially inside the fitting portion 32 of the lever plate 22. When the connecting ring 21 reaches the above position, it restores elastically and radially outwardly and engages with the fitting portion 32. Then the release bearing 20 is returned axially outwardly, so that the fitting portion 37 in the inner race extension 24 is fitted to the connecting ring 21 an the assembly is completed, as illustrated in FIG. 10.

In the disassembly operation of the mechanism, the release bearing 20 is pushed axially inwardly to temporarily move the inner race 23 from the assembly position shown in FIG. 10 to the pushed-in position in FIG. 14. Whereby, the connecting ring 21 pushed by the pushing surface 60 moves from the fitting portion 32 toward the projection 35, passes radially inside the projection 35 while it is located in the third escape groove 36, and deflects elastically and radially outwardly into the second escape groove 33. In this condition, since the connecting ring 21 will not engage with the extension 24, the release bearing 20 can be moved axially outwardly to completely pull out the extension 24 from the lever plate 22.

In the assembly operation described above, even if the axially inward force is erroneously applied to the connecting ring 21 after the ring 21 is fitted to the fitting portion 32, as shown in FIG. 13, the projection 35 prevents the connecting ring 21 from moving to the second groove 33. As will be apparent from the above, an axially outer side surface 61 (FIG. 10) of the projection 35 has appropriate size and inclination angle by which the normal force applied in the assembling operation can not cause the connecting ring 21 to pass over the side surface 61, and specifically, the inclination angle of the side surface 61 with respect to the axial direction may be larger that the inclination angle of the guide portion 31.

Of course, with taking the disassembly operation into consideration, since the side surface 61 is appropriately inclined when the force larger than &hat applied in the usual assembly operation is applied to the connecting ring 21, the connecting ring 21 is guided along the side surface 61 to elastically and radially inwardly deflect, and thus it can pass radially inside the projection 35.

In the assembling operation after the disassembly, it is necessary to change the position of the ring 21 from the second escape groove 33 to the first escape groove 30. In order to facilitate this operation, a bottom surface 62 (FIG. 10) of the second escape groove 33 extends in a cylindrical shape to the axially inner edge of the lever plate 22, so that the connecting ring 21 can be removed from the groove 33 by moving the ring 21 along the bottom surface 62.

FIG. 15 illustrates a modification of the embodiment in FIGS. 10-14. In this modified embodiment, an annular bottom surface 65 which forms the fitting portion 32 of the lever plate 21 extends axially through a certain length, and the axial length of this annular groove, i.e., a distance between the side surface 61 of the projection and the axially outer side surface 66 of the fitting portion 32 is larger than the diameter of the member itself forming the connecting ring 21.

In the assembly operation of this structure, the connecting ring 21 fitted to the fitting portion 32 can axially move a short distance. Therefore, when a worker supposes that the the ring 21 is fitted to the fitting portion 32, he can confirm it by confirming that the inner race 23 can be moved through said short distance.

In a modification in FIG. 16, a projection 67 is formed at the axially inner end of the bottom surface 62 of the second ring escape groove 33 so as to prevent the disengagement of the ring 21 from the bottom surface 62.

As illustrated in FIG. 17, the inner race extension 24 may be fitted to the outer periphery of the lever plate 22. Further, the the lever plate 22 may be provided with the third ring escape groove 36, as shown in FIG. 18, and the inner race extension 24 may be provided with the first and second ring escape grooves 30 and 33.

Figure 20:
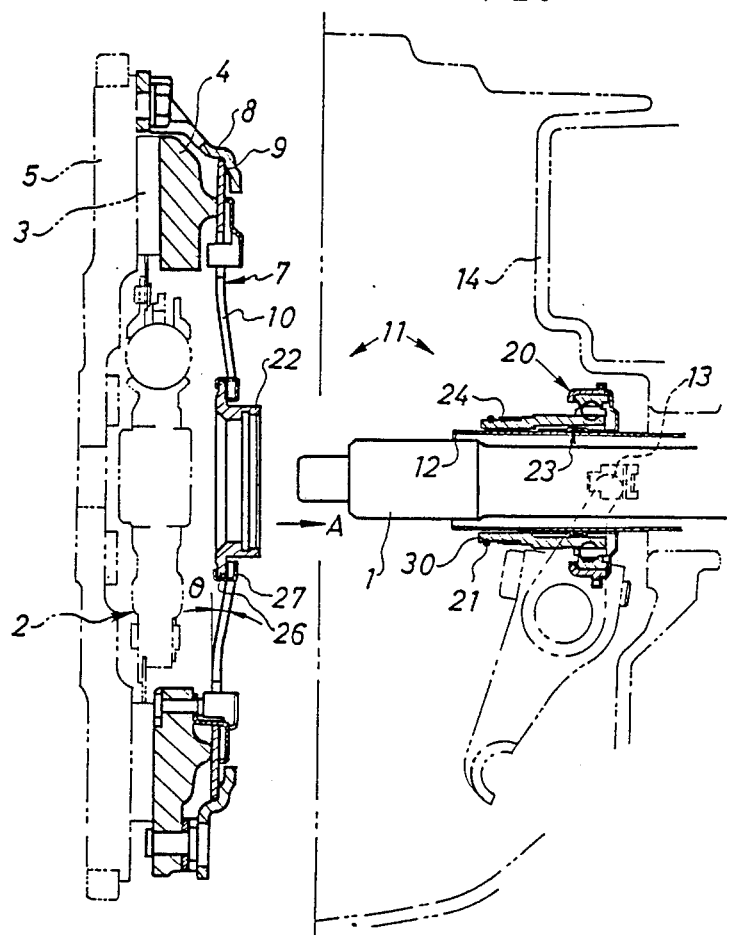
FIG. 20 is a sectional view, in an exploded condition, of a clutch employing the embodiment in FIG. 19.

FIG. 20 illustrates a further modification. The connecting ring 21 in this embodiment is formed by a substantially annular member having a circular section, and is provided at one portion with a cut. The connecting ring 21 interposed between the extension 24 and the lever plate 22 is radially outwardly deflected, and thus tends to deflect radially inwardly.

Figure 19:
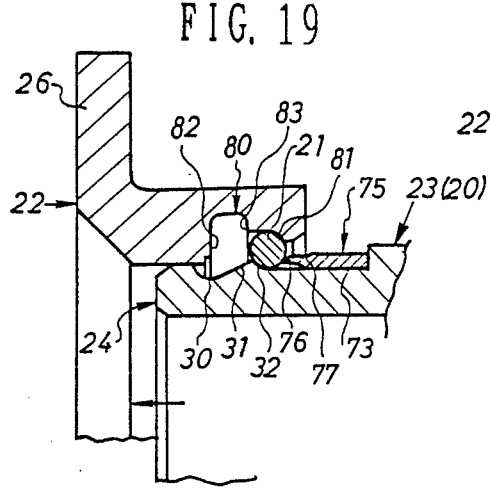
FIG. 19 is a sectional view of a third embodiment.
Figure 21:
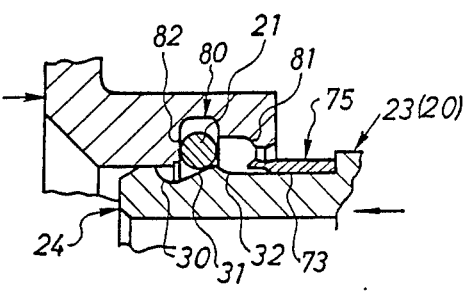
FIGS. 21–25 are sectional views illustrating various conditions during assembly and/or disassembly operation, respectively.

Referring to FIG. 19, the extension 24 is provided at the outer peripheral surface, which is a first cylindrical surface, with a first ring escape groove 30 adjacent to the axially inner end thereof. The axially outer side surface of the first ring escape groove 30 forms a tapered guide portion 31. The first fitting portion 32 is formed axially outside the guiding portion 31. The first fitting portion 32 is located by a concave or stepped portion having a section of an arcuate shape, of which bottom surface axially extends to form a slide surface 73 for a retainer 75.

Figure 24:
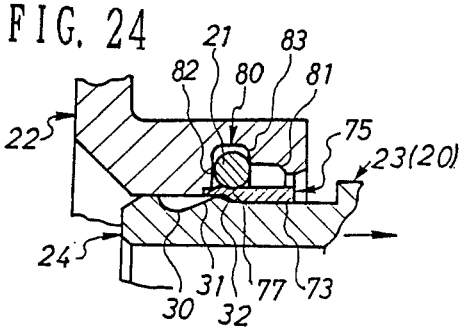

The retainer 75 of a cylindrical shape is slidably fitted around the slide surface 73 and can axially move between an open position in FIG. 19 and a closed position in FIG. 24. In the closed position in FIG. 24, the retainer 24 contacts at its axially inner portion with the first fitting portion 32 to cover the periphery thereof. The retainer 75 can not move axially beyond the position shown in FIG. 24, so that the first ring escape groove 30 will not be covered by the retainer 75. In the open position in FIG. 19, the retainer 75 contacts at the other end with the outer peripheral stepped portion of the extension 24 without covering the first fitting portion 32, and the end thereof is adjacent to the first fitting portion 32.

The retainer 75 is provided at the outer periphery of the axially inner end portion with axially outwardly diverging tapered surface, which forms a scoop-up portion 76 for the connecting ring. The retainer 75 is provided at the outer periphery with an annular concave portion located axially outside the scoop-up portion 76, which forms, as shown in FIG. 24, a holding portion 77 for fitting to and holding the inner periphery of the connecting ring 21.

The inner peripheral surface of the lever plate 22 forms a second cylindrical surface, which is provided at the axially middle portion wi&h a second ring escape groove 80 and is provided with a second fitting portion 81 located axially outside the groove 80. Both side surfaces of the second ring escape groove 80 radially extend to form first and second engagement surfaces 82 and 83, respectively. The second engagement surface 83 at the axially outer side has a diameter larger than that of the first engagement surface 82. The second fitting portion 81 is formed by a concave or stepped portion having an arcuate section, of which bottom surface cylindrically extends in the axially inward direction to the inner periphery of the second engagement surface 83.

The sizes and shapes of the parts and portions described above are so determined that they may operate as follows.

In the assembly operation, the connecting ring 21 is set in the first escape groove 30 in the extension 24. Then, the bearing is moved axially inwardly to push the extension 24 into the lever plate 22. When the bearing 20 is pushed to some extent, the connecting ring 21 engages with the first engagement surface 82 of the lever plate 22, so that in the further pushing operation, the first engagement surface 82 pushes the connecting ring 21 axially outwardly with respect to the cylindrical extension 24.

Figure 22:
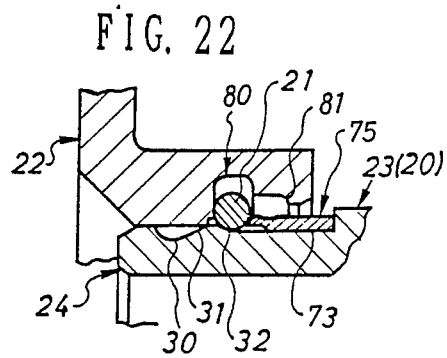

Thus, the ring 21 slides on the guide portion 31 while elastically widening itself and reaches the first engagement portion 32 as shown in FIG. 22.

Then the extension 24 is pulled axially outwardly, so that the ring 21 is fitted to the second fitting portion 81 in the lever plate 22 and the assembly is completed, as shown in FIG. 19. In this assembled condition, the first fitting portion 32 is fitted in the axially and radially outward directions to the connecting ring 21, and the second fitting portion 81 is fitted in &he axially and radially inward directions to the connecting ring 21.

In the disassembly operation, the bearing 20 is pushed axially inwardly, whereby the connecting ring 21 which is fitted to the extension 24 by its own elasticity (and, in some case, is engaged with the end of the retainer 75) moves together with the extension 24 to a position at which it engages with the first engagement surface 82, as shown in FIG. 22.

Figure 23:
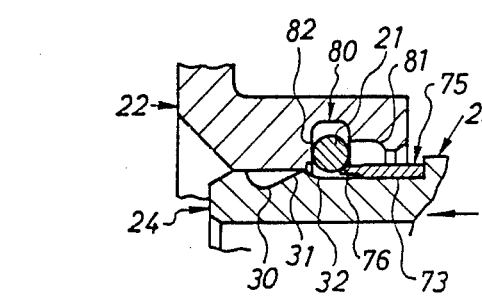

When the bearing 20 is further pushed after the first engagement surface 82 engages with the connecting ring 21, the ring 21 is scooped up by the scoop-up portion 76 of the retainer 75, as shown in FIG. 23, and is relatively moved to the holding portion 77 while elastically widening itself. At the holding portion 77 the ring 21 it elastically contracts and engages with the outer periphery of the holding portion 77. Then the bearing 20 is reversely, i.e., axially outwardly, pulled. In this operation, the ring 21 engages with the second engagement surface 83, and the retainer 75 moves to the closed position relative to the extension 24 with holding the ring 21 in said engaged position.

Figure 25:
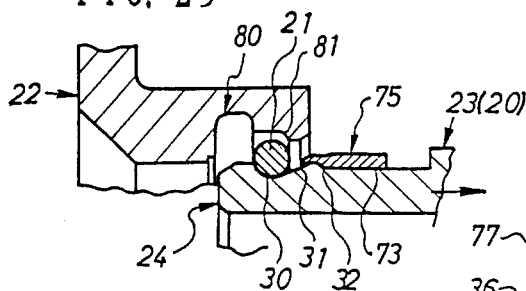

When the retainer 75 reaches the closed position, further movement is prevented. Thus, when the bearing 20 is further pulled, the extension 24 and the retainer 75 move relative to the lever plate 22, as shown in FIG. 25, so that the connecting ring 21 is disengaged from the retainer 75, and due to its own radially inward elastical force, slides on the tapered outer peripheral surface of the guide portion 31 of the extension 24 into the first groove 30. Thus, the extension 24 can be removed from the lever plate 22.

When the disassembly is completed, the connecting ring 21 is located in the first ring escape groove 30. Therefore it is not necessary to elastically deflect and move the connecting ring 21 to other position prior to the subsequent assembly operation.

Figures 26, 27:
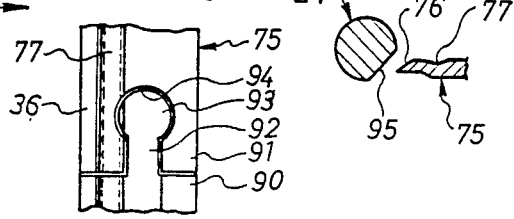
FIG. 26 is a fragmentary developed view of a retainer in the third embodiment.
FIG. 27 is a sectional view of a modified structure of a connecting ring in the third embodiment.

In the structure described above, it is necessary to form a cut in the retainer 75 so as to enable the assembly of the retainer 75 around the slide surface 73. For this purpose, as shown in FIG. 26, the retainer 75 in this embodiment is formed by a cylindrically curved belt-like member, of which opposite ends 90 and 91 are jointed together after the assembly. For this joint, the end 90 includes a belt-like projection 92 projected in the lengthwise direction of said belt-like member and a circular portion 93 formed at the end of the projection 92. The projection 92 and the portion 93 are accommodated in a recess 94 formed in the end 91.

The structures described above can achieve the effect same as or similar to that by the other embodiments described before.

Further, after the disassembly, the connecting ring 21 is located in the first ring escape groove 30, i.e., in a position for the start of the assembly operation, so that the subsequent assembly operation can be facilitated.

This embodiment may be modified as follows.

In order to surely and smoothly perform the scooping-up by the retainer 75, a portion of the ring 21 adjacent to the end of the retainer 75 may be recessed to form a tapered surface 95.

In the embodiment in FIG. 19, the first cylindrical surface provided with the first ring escape groove 30 and others is formed in the inner race extension 24, and the second cylindrical surface provided with the second ring escape groove 80 is formed in the lever plate 22. However, the first cylindrical surface may be formed at the inner periphery of the lever plate 22, and the second cylindrical surface may be formed at the outer periphery of the extension 24. In which case, the grooves, fitting portions and others are arranged at the axial relationship reverse to that in the illustrated embodiment.

Figure 28:
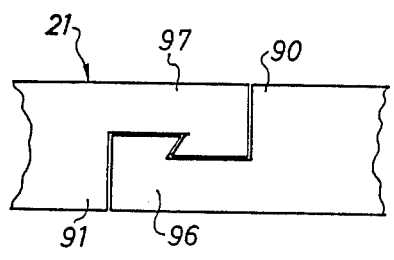
FIGS. 28 and 29 are developed views of further modified structures of a retainer, respectively.
Figure 29:
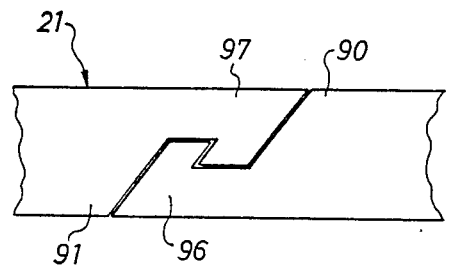

Instead of the structure in FIG. 26, the retainer 75 may be provided at the ends 90 and 91 with hook-like projections 96 and 97 which engage with each other, as illustrated in FIGS. 28 and 29.

As stated hereinbefore, the present invention can be effectively used for facilitating the assembly and disassembly operations and increasing the mechanical reliability in the release mechanism of the clutch for the automobiles and others.

What is claimed is:

1. A release bearing mechanism of a clutch comprising:
    a release bearing to which an operation mechanism is connected for applying an operation force in an axially outward direction of the clutch thereto, said release bearing including an inner race provided with an axially inwardly extending generally cylindrical extension having a generally cylindrical outer peripheral surface;
    a partially cylindrical lever plate having a generally cylindrical inner peripheral surface surrounding said generally cylindrical outer peripheral surface of said extension and fixed to a diaphragm spring;
    one of said generally cylindrical surfaces being provided with a first ring escape groove, a substantially tapered guide portion extending axially and radially outwardly from a bottom surface of said ring escape groove and a first ring fitting portion adjacent to and axially outward said guide portion;
    the other of said generally cylindrical surfaces being provided with a second ring escape groove and second ring fitting portion adjacent to and axially outward of said second ring escape groove;
    a radially elastically deflected connecting ring interposed between said generally cylindrical surfaces;
    a ring pushing means for axially pushing said connecting ring from said second ring fitting portion to said second ring escape groove in said other generally cylindrical surface;
    both of said ring escape grooves having depth which permits axially relative movement between said lever plate and said extension when said connecting ring is accommodated in either of said grooves; and
    said fitting portions being adapted to fit to said connecting ring at radially opposite directions and axially opposite directions, respectively.

2. A release bearing mechanism of a clutch comprising:
    a release bearing to which an operation mechanism is connected for applying an operation force in an axially outward direction of the clutch thereto, said release bearing including an inner race provided with an axially inwardly extending generally cylindrical extension including a first generally cylindrical surface;
    a partially cylindrical lever plate including a second generally cylindrical surface surrounding said generally cylindrical surface of said extension and fixed to a diaphragm spring;
    a connecting ring radially interposed between said first and second generally cylindrical surfaces;
    said first cylindrical surface being provided with a first ring escape groove, a substantially tapered guide portion formed by a side surface of said first ring escape groove, a first ring fitting portion disposed axially outward of said first ring escape groove and adapted to radially and axially fit to the connecting ring, and a slide surface disposed axially outward of said first ring fitting portion;
    a generally cylindrical retainer which is slidably fitted to said slide surface and is movable between an open position for opening said first fitting portion and a closing position for covering said first fitting portion;
    said retainer being provided on a surface radially remote from said slide surface with a ring holding portion for holding said connecting ring, and being provided at an end adjacent to said first ring fitting portion with a scoop-up portion for scooping up and guiding said connecting ring from said first generally cylindrical surface to said holding portion;
    said second generally cylindrical surface being provided with a second ring escape groove and a second ring fitting portion disposed axially outward of said second ring escape groove and adapted to fit to said connecting ring from a side thereof radially and axially opposite to said first ring fitting portion;
    said second ring escape groove having a pair of side surfaces, one of which is remote from said second ring fitting portion and forms a first engagement surface for axially engaging with said connecting ring when said connecting ring is located in said first ring escape groove, and the other of which forms a second engagement surface for axially engaging with said connecting ring when said connecting ring is held by said retainer;
    said second ring escape groove having a depth which permits axial movement of the connecting ring relative to said first generally cylindrical surface and said retainer when said connecting ring is located in said second ring escape groove; and
    said first ring escape groove having a depth which permits axial movement of said connecting ring with respect to said second generally cylindrical surface to a position at which it contacts said first engagement surface when said connecting ring is located in said first ring escape groove.

3. A release bearing mechanism of claim 2 wherein said retainer is formed by a cylindrically curved belt-like plate having opposite ends which are jointed together one of said end being provided with belt-like projection having a protrusion and the other end having a recess for accommodating said projection.

4. A release bearing mechanism of claim 2 wherein said connecting ring includes a tapered surface to be scooped up by said scoop-up portion.

5. A release bearing mechanism of claim 2 wherein said holding portion of said retainer is formed by a concave portion on an outer peripheral portion of said retainer.

* * * * *